United States Patent [19]

Kandarian

[11] Patent Number: 4,830,548
[45] Date of Patent: May 16, 1989

[54] METHOD AND APPARATUS FOR CUTTING

[76] Inventor: Richard Kandarian, 343A Elm St., Birmingham, Mich. 48009

[21] Appl. No.: 45,900

[22] Filed: May 4, 1987

[51] Int. Cl.[4] .................. B23B 51/05; B23B 51/10
[52] U.S. Cl. .................................... 408/1 R; 30/310;
  408/200; 408/204; 408/209; 408/212; 408/225;
  408/233; 408/703; 408/713
[58] Field of Search ............... 408/200, 201, 1 R, 209,
  408/211, 212, 225, 186, 189, 196, 197, 198, 233,
  204, 206, 207, 713, 213, 703; 30/300, 303, 310

[56]              References Cited
            U.S. PATENT DOCUMENTS 2,811,184  10/1957  Brzozowski ............... 408/225 X
2,937,545   5/1960  Rauer et al. ................. 408/201

FOREIGN PATENT DOCUMENTS 2030025  12/1971  Fed. Rep. of Germany ...... 408/200

Primary Examiner—Gil Weidenfeld
Assistant Examiner—Steven C. Bishop
Attorney, Agent, or Firm—Krass & Young

[57]                  ABSTRACT

A cutting tool assembly including an elongated pilot holder and a cutter blade adapted to be transversely positioned in a transverse slot in the pilot holder. The cutter blade includes cutting edges along one transverse edge of the blade and notches in the upper and lower transverse edges of the blade for respective coaction with a set screw received in a threaded central axial bore in the lower pilot end of the pilot holder. In use, the lower pilot portion of the pilot holder is positioned in a previously provided pilot hole in a plate member, and the pilot holder is lowered and simultaneously rotated to move the cutting edge of the cutter blade into the upper face of the plate member to perform a cutting operation in the upper face, whereafter the pilot holder and cutter blade are raised, the set screw is loosened to allow removal of the cutter blade from the pilot holder, the pilot holder is lowered to dispose the slot below the lower face of the plate member, the cutter blade is rotated through 180° and reinserted into the slot in the pilot holder, the set screw is threadably advanced to engage the notch in the other transverse edge of the blade holder, and the pilot holder is raised and simultaneously rotated to perform a cutting operation in the lower face of the plate member. A novel peripheral cutter blade is also disclosed, as well as a method whereby the novel peripheral cutter blade may be utilized to form a hole in a plate member.

7 Claims, 3 Drawing Sheets

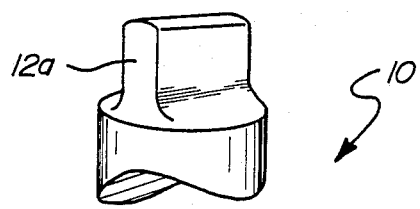
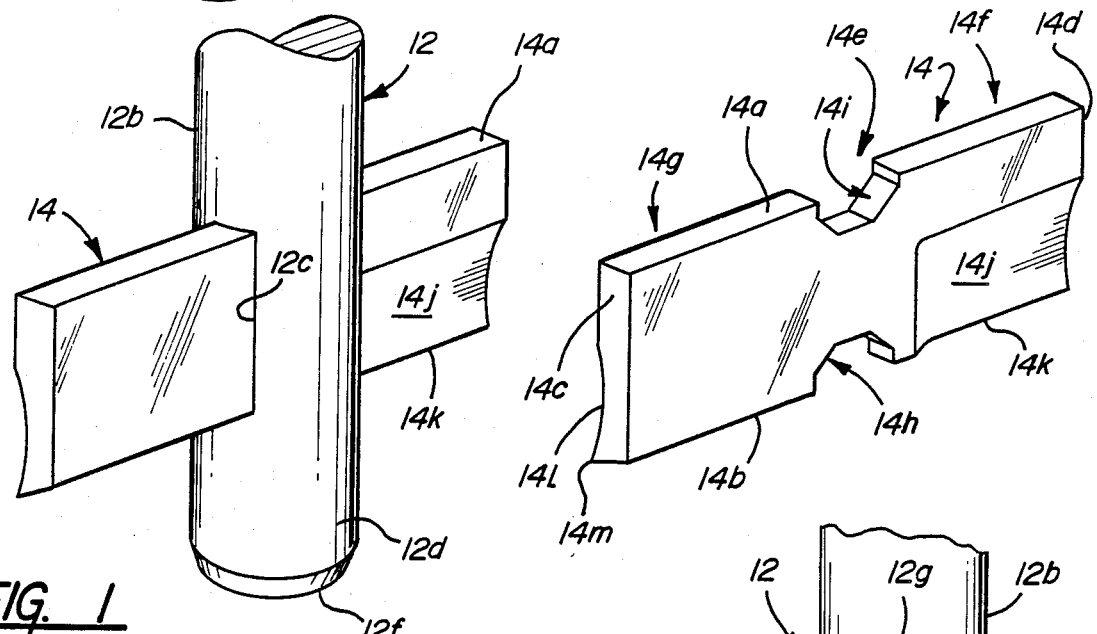
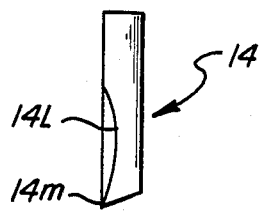
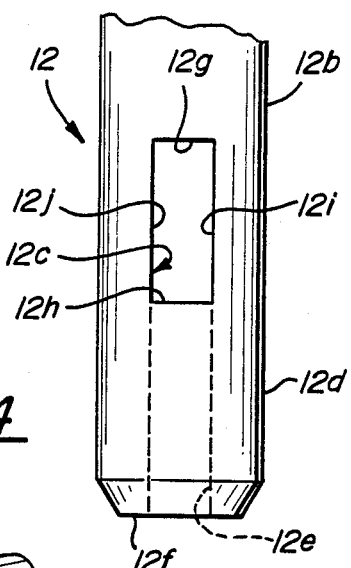
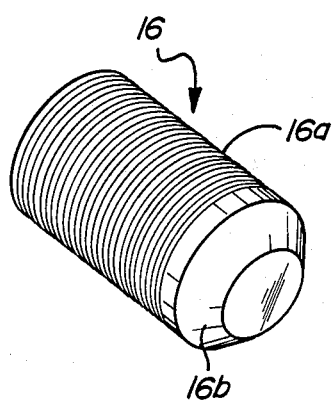
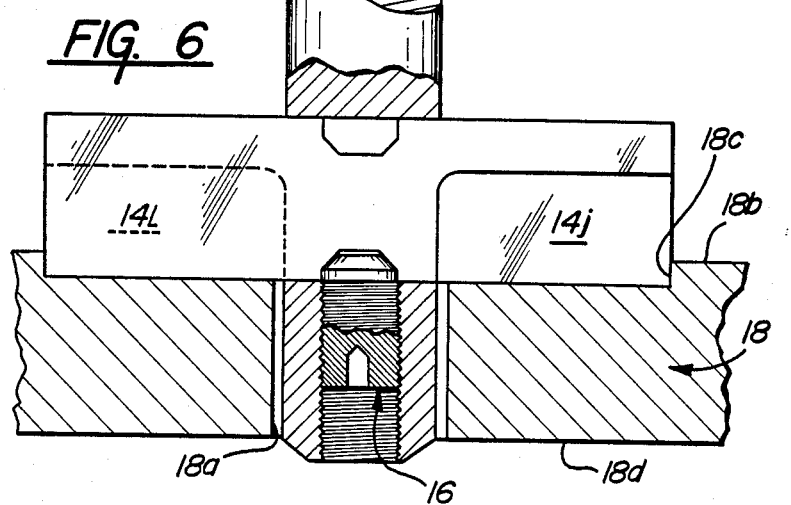

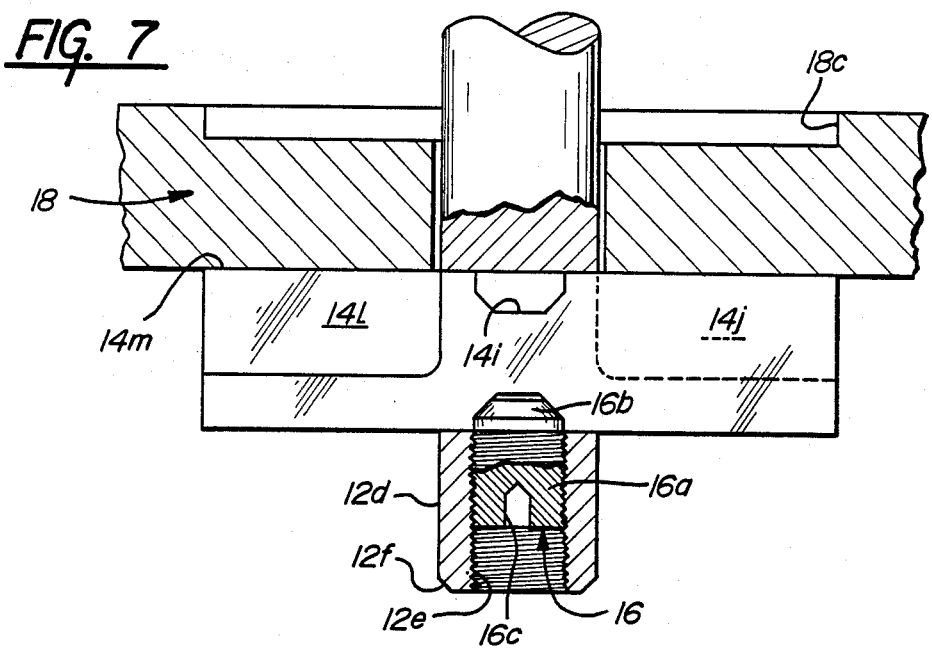
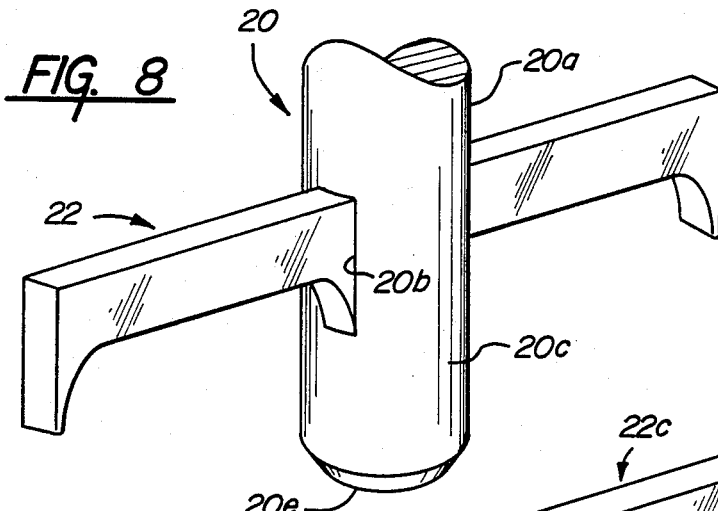
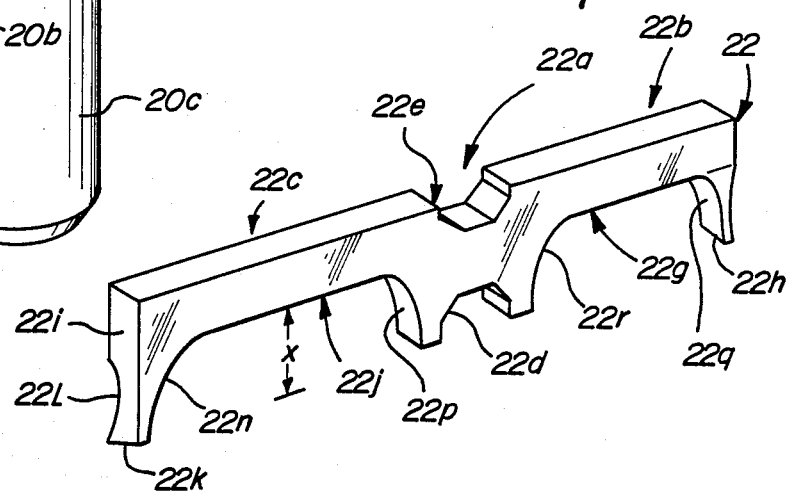
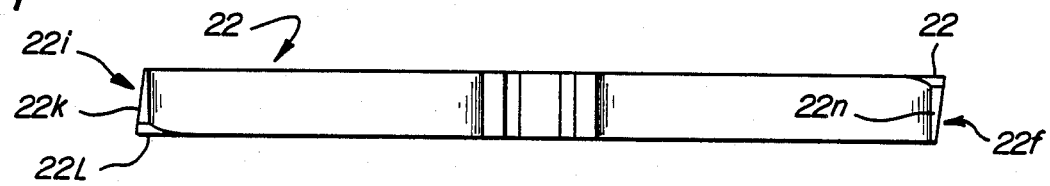

METHOD AND APPARATUS FOR CUTTING

BACKGROUND OF THE INVENTION

This invention relates to metal cutting and in particular to methods and apparatus for performing relatively large surface area cutting operations on metal plates using relatively low power equipment.

In general, performing large surface area cutting operation on metal plates requires equipment having a size and power proportionate to the size of the cutting operation to be produced. Various attempts have been made to provide methods and apparatus for performing large surface area cutting operations utilizing relatively low power equipment. In one such method and apparatus, a cutter blade is positioned transversely in a slot in an elongated pilot holder at a location spaced axially from the leading end of the holder so as to define a pilot portion on the holder ahead of the cutter blade; a pilot hole having a diameter substantially corresponding to the diameter of the pilot portion of the pilot holder is provided in the plate member to be cut; the pilot portion of the pilot holder is positioned in the pilot hole; and the pilot holder is advanced axially to move the cutter blade into the plate member and form a spot face or counterbore with respect to the pilot hole. This arrangement is effective in performing relatively large surface area operations on metal plate material but the diameter of the spot face, holes, or counterbores that can be performed with this arrangement is still significantly limited by the limitations of the associated power equipment and by the strength limitations of the blade. The described arrangement has the further disadvantage that, when it is desired to form a counterbore or spot face on both sides of the metal plate, it is necessary to utilize a first cutter blade to work on one face of the plate and another cutter blade having a backward cutting edge design to work on the other face of the plate.

SUMMARY OF THE INVENTION

The invention is directed to the provision of an improved method and apparatus for providing relatively large diameter holes in metal stock.

More specifically, the invention is directed to the provision of an improved method and apparatus for providing relatively large diameter holes in metal stock utilizing relatively low power equipment.

The invention is further directed to the provision of a cutting apparatus of the pilot holder and cutter blade type in which a single cutter blade may be utilized to work on both side faces of the associated workpiece.

According to the invention method, a pilot hole is provided in the plate member; a cutter blade is mounted transversely in an elongated pilot holder and is positioned such that a cutting edge at the transverse side of the blade nearest one end of the holder is spaced axially from the one holder end; the holder is moved in one axial direction to pass the one holder end into the pilot hole and move the cutting edge on the cutter blade into one side of the plate member to remove material from the one side of the plate member; the cutting blade is removed from the holder, rotated through 180°, and repositioned transversally in the holder so that the cutting edge is on the transverse side of the blade remote from the pilot end of the holder member; the holder is adjusted axially relative to the plate member such that the cutting edge is in confronting relation to the other side of the plate member; and the holder is moved in the other axial direction to move the cutting edge into the other side of the plate member and remove material from the other side of the plate member.

According to a further feature of the invention, the blade includes left and right cutting portions extending for equal distances from the left and right sides of the pilot holder so as to cut in a concentric manner with respect to the pilot hole.

According to a feature of one embodiment of the invention, the cutting edge comprises a cutting edge extending from the outer peripheral edge of each blade cutting portion substantially to the holder so that a counterbore or spot face may be formed in one side face of the plate member by the cutter blade and a counterbore or spot face may be formed in the other side face of the plate member using the same cutter blade.

According to a feature of another embodiment of the invention, the cutting edge comprises a cutting edge provided only at the outer peripheral edge of each blade cutting portion with each cutting portion relieved between its peripheral cutting edge and the holder so that circular notches are cut in the respective sides of the plate member. This arrangement allows low power equipment to be utilized to form large diameter holes in a plate member having a thickness equal to up to twice the depth of the circular notches formed in each side of the plate member.

The cutting tool apparatus of the invention comprises an elongated pilot holder including an upper attachment portion for removable receipt in a chuck, a shank portion below the attachment portion and including a transverse through slot, and a lower pilot portion below the shank portion including a central threaded axial bore opening at its upper end in the transverse slot and its lower end in the lower end of the pilot portion; a set screw for threaded receipt in the threaded axial bore and defining a head at its upper end for upward projection into the slot; and a cutter blade adapted to be positioned in the slot in transverse relation to the central axis of the pilot holder. The cutter blade includes a central attachment portion having a thickness and height generally corresponding respectively to the thickness and height of the slot so as to be slidably received in the slot, a right cutting portion extending to one side of the pilot holder and including a cutting edge at the lower transverse side of the blade, a left cutting portion extending to the other side of the pilot holder and including a cutting edge at the lower transverse side of the blade, a notch in the lower side of the attachment portion sized to receive the head of the set screw, and a matching notch in the upper side of the attachment portion sized to receive the head of the set screw. With this arrangement, the blade may be initially mounted in the pilot holder with the set screw locked into the notch in the lower side of the attachment portion of the cutter blade, the pilot portion of the pilot holder may be positioned in a previously provided pilot hole in the plate to be cut, the pilot holder may be advanced axially to move the cutter blade into the plate and remove material in a concentric fashion with respect to the pilot hole; the set screw may be loosened to allow the blade to be removed from the pilot holder, the pilot holder may be passed downwardly through the pilot hole to dispose the slot below the plate, the cutter blade may be reversed and repositioned in the pilot holder with the set screw engaging the notch in the other side of the cutter blade to position the cutting edge upwardly in confronting relation to the underside of the plate, and the pilot holder may be moved axially upwardly to cut into the underside of the plate to remove material from the underside of the plate.

In the embodiment of the invention in which the cutting edge on each of the right and left cutting portions of the cutter blade extends transversely from a location proximate the central attachment portion to the outer peripheral edge of the respective cutting portion, spot faces or counterbores may thus be respectively provided on the upper and lower faces of the plate in response to upward or downward cutting movement of the same cutter blade into the plate.

In the embodiment of the invention in which the cutting edge on each of the left and right cutting portions is provided only at the peripheral outer edge of the respective cutting portion with each portion relieved between its outer edge and the attachment portion, large diameter circular notches may thus be provided in the upper and lower sides of the plate utilizing the same cutter blade and the notches may coact to remove a large diameter slug from the plate.

The invention also provides a cutter blade for use with an elongated pilot holder of the type including a transverse slot for removable receipt of the cutter blade at a position transverse to the central axis of the pilot holder. The blade comprises a central attachment portion sized to fit in the slot in the pilot holder and including attachment means for removable attachment of the blade to the pilot holder, and left and right cutting portions on opposite sides of the attachment portion and each including a cutting edge at the outer peripheral edge thereof at one transverse side of the blade and each being relieved between the cutting edge and the attachment portion. This blade configuration allows a large diameter circular notch to be conveniently formed in the blade member concentric to the pilot hole in which the leading end of the pilot holder is received.

According to a further feature of the invention, the cutter blade is formed of a flat elongated bar having a height and thickness generally corresponding to the height and thickness of the transverse slot in the pilot holder; the central portion of the blade is the full height of the bar; and the cutting portions are the full height of the bar at their outer peripheral cutting edges and of reduced height between their cutting edges and the attachment portion. This particular blade configuration provides an efficient means for providing a large circular notch in the plate to be cut utilizing relatively low power equipment.

According to a further feature of the invention, the attachment means on the attachment portion of the blade comprises a notch formed in the attachment portion at the transverse side of the blade in which the cutting edges are provided. This arrangement provides a ready and convenient means for attaching the cutter blade to the pilot holder.

BRIEF DESCRIPTION OF THE DRAWINGS

FIG. 1 is a perspective view of a cutting tool assembly according to the invention;

FIG. 2 is a perspective view of a cutter blade utilized in the cutting tool assembly of FIG. 1;

FIG. 3 is an end view of the cutter blade of FIG. 2;

FIG. 4 is a fragmentary view of a pilot holder utilized in the cutting tool assembly of FIG. 1;

FIG. 5 is a perspective view of a set screw utilized in the cutting tool assembly of FIG. 1;

FIGS. 6 and 7 are views showing the manner in which the cutting tool assembly of FIG. 1 is utilized to cut a relatively large diameter hole in a metal plate member;

FIG. 8 is a fragmentary perspective view of a modified form of cutting tool assembly;

FIG. 9 is a perspective view of a cutting blade utilized in the cutting tool assembly of FIG. 8;

FIGS. 10, 11 and 12 are bottom, top and end views respectively of the cutter blade of FIG. 9.

DETAILED DESCRIPTION OF THE PREFERRED EMBODIMENTS

Figure 12:
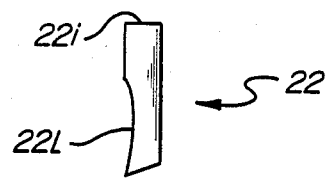

The cutting tool assembly seen generally at 10 in FIGS. 1–7 includes a pilot holder 12, a cutter blade 14 and a set screw 16.

Pilot holder 12 is formed of round steel bar stock and includes an upper attachment portion 12a for removable receipt in a chuck or spindle, a shank portion 12b below attachment portion 12a and including a transverse through slot 12c, and a pilot portion 12d below shank portion 12b and including a central threaded axial bore 12e opening at its upper end in transverse slot 12c and at its lower end in the lower end 12f of the pilot portion. Attachment portion 12a may be especially configured, as shown, to accommodate the chuck or spindle or may simply provide a smooth upward continuation of shank portion 12b. Slot 12c is generally rectangular and includes an upper face 12g, a lower face 12h, and side faces 12i and 12j. The slot has a thickness as measured between side faces 12i and 12j that is preferably a minor fraction of its height as measured between top and bottom faces 12g and 12h.

Blade 14 is formed of a flat bar of suitable tool steel material having a thickness generally corresponding to the thickness of slot 12c and a height generally corresponding to the height of slot 12c. Blade 14 has a generally rectangular configuration with generally parallel upper and lower transverse edges 14a and 14b and generally parallel end edges 14c and 14d. Blade 14 includes a central attachment portion 14e, a right cutting portion 14f, and a left cutting portion 14g. A notch 14h of generally truncated pyramidal configuration is provided in central attachment portion 14e in the lower transverse edge 14b of the blade and a matching notch 14i is provided in central attachment portion 14e in the upper transverse edge 14a of the blade. Right cutting portion 14f is relieved at 14j along its front face to define a cutting edge 14k along the lower transverse edge of the blade and left cutting portion 14g is relieved at 14l at the rear face of the blade to provide a cutting edge 14m extending along the lower transverse edge 14b of the blade. Cutting edge 14k extends from a location proximate the central attachment portion 14e of the blade to the outer peripheral edge 14d of the blade and cutting edge 14m extends from a location proximate the central attachment portion 14e to the outer peripheral edge 14c of the blade. The lower transverse edge 14b of the blade is bevelled along cutting edge 14m to increase the acuteness of the cutting edge and the lower transverse edge of the blade is similarly but oppositely beveled along the cutting edge 14k to similarly increase the acuteness of that cutting edge.

Set screw 16 is sized to fit threadably in threaded bore 12e and includes a threaded main body portion 16a, a head portion 16b of generally truncated, pyramidal configuration, and a socket portion 16c to receive a suitable insertion and removal tool.

In the use of the invention cutting tool assembly of FIGS. 1-7 with respect to a metallic plate member such as the plate member 18, blade 14 is positioned in pilot holder 12 with cutting edges 14k and 14m positioned downwardly; set screw 16 is threaded into threaded bore 12e to seat the head portion 16b of the set screw in lower notch 14h and firmly lock the blade in the pilot holder; a drill is utilized to provide a pilot bore 18a in plate member 18 having a diameter somewhat greater than the diameter of pilot portion 12d of pilot holder 12; pilot portion 12d is positioned in pilot hole 18a; and pilot holder 12 is suitably rotated and advanced downwardly to move cutting blade 14 into the upper surface 18a of the plate member and form a spot face or counterbore 18c in the upper face of the plate member concentric with pilot hole 18a. When the pilot holder has been advanced downwardly to an extent to form the desired spot face or counterbore, the pilot holder and blade are raised, set screw 16 is loosened to allow the blade to be removed transversely from the pilot holder, the pilot holder is moved downwardly to dispose the pilot portion and the slot 12c below plate member 18, blade 14a is rotated through 180° and reinserted in slot 12c, set screw 16 is moved upwardly in threaded bore 12e to seat set screw head portion 16b in notch 14i, and the pilot holder is moved upwardly and rotated in an opposite sense to move cutting edges 14k and 14m upwardly into engagement with the lower face 18d of plate member 18 and form a lower counterbore or spot face in the plate member. Set screw 16 may now be loosened to allow removal of the cutter blade, pilot holder 12 may be raised to position pilot portion 12d above plate 18, and the cutter blade may be rotated through 180° and reinserted in slot 12c preparatory to a new hole cutting operation in a further location in the same plate member or in a different plate member.

Figure 13:
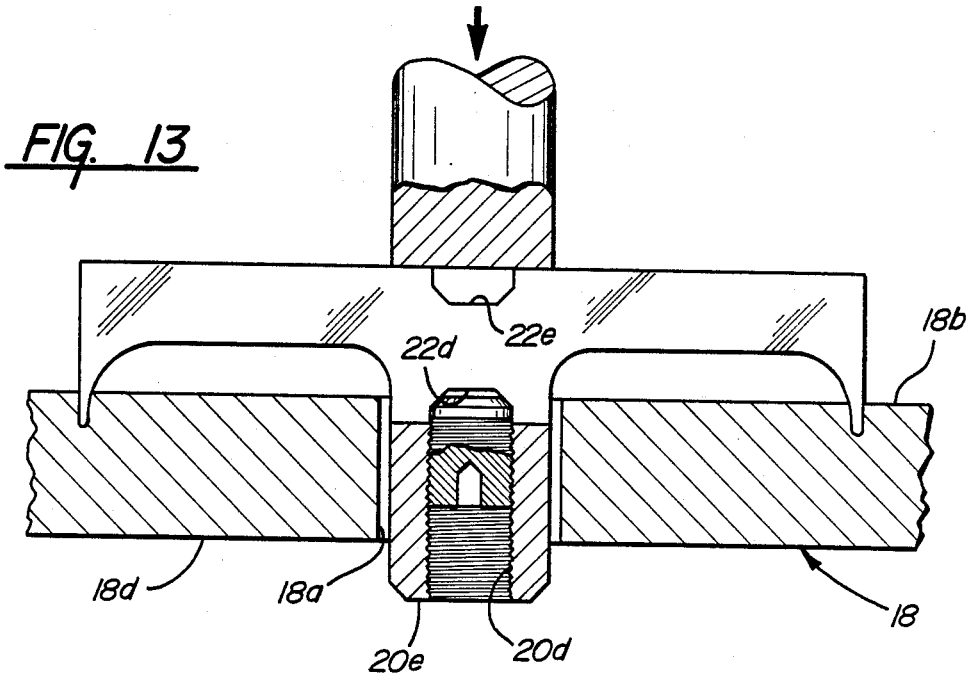
FIGS. 13 and 14 are views showing the manner in which the cutting tool assembly of FIG. 8 is utilized to cut a relatively large diameter hole in a metal plate member.
Figure 14:
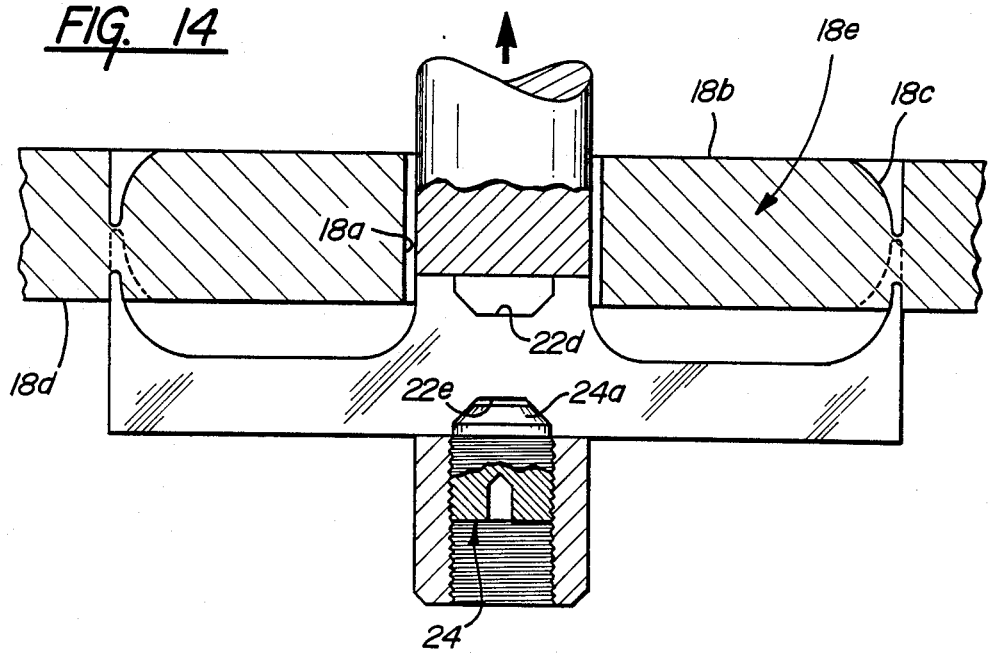

The cutting tool assembly of FIGS. 8-14 includes a pilot holder 20, a cutter blade 22, and a set screw 24.

Pilot holder 20 is identical to pilot holder 12 and includes an attachment portion (not shown), a shank portion 20a including a slot 20b, and a pilot portion 20c including a threaded central axial bore 20d opening at its upper end in slot 20b and at its lower end in the lower end 20e of the pilot portion. Cutter blade 22 is formed of a generally rectangular bar of tool steel having a height and width generally corresponding to the height and width of slot 20b so that the cutter blade may be moved transversely into and out of the slot 20b.

Cutter blade 22 includes a central attachment portion 22a, a right cutting portion 22b, and a left cutting portion 22c. Central attachment portion 22a extends the full height of the cutter blade and includes a lower notch 22d of generally truncated pyramidal configuration opening in the lower transverse edge of the cutter blade, and a matching upper notch 22e of generally truncated pyramidal configuration opening in the upper transverse edge of the cutter blade. The right cutting portion 22b extends for the full height of the cutter bar at the outer peripheral edge portion 22f of the cutting portion and is relieved at 22g between outer edge 22f and attachment portion 22a to define a cutting edge 22h at the lower edge of peripheral edge portion 22f. Similarly, the outer peripheral edge portion 22i of the left cutter portion 22c extends for the full height of the cutter blade and the cutting portion 22c is relieved at 22j between peripheral edge portion 22i and attachment portion 22a to define a cutting edge 22k at the lower edge of peripheral edge portion 22i. Peripheral edge portion 22i is relieved at 22l and peripheral edge portion 22f is relieved at 22m and, as best seen in FIG. 10, cutting edge 22k tapers to a point at one side face of the cutter blade and cutting edge 22h tapers to a point at the opposite side face the cutter blade. Relief 22j blends in a smooth arc 22n with peripheral edge portion 22i and in a further smooth arc 22p with attachment portion 22a, and relief 22g blends in a smooth arc 22q with peripheral edge portion 22f in a further smooth arc 22r with attachment portion 22a.

Set screw 20 is identical to set screw 16 of the FIGS. 1-7 embodiment.

In the use of the cutting tool assembly of the FIGS. 8-14 embodiment, a suitable pilot hole 18a is formed in the plate member; cutter blade 22 is positioned in slot 20b with cutting edges 22k and 22h facing downwardly; set screw 24 is threaded upwardly in bore 20d to seat head portion 24a in lower notch 22d; pilot holder 20c is lowered into pilot hole 18a and rotated to advance cutter blade 22 into the upper face 18b of plate member 18 and form a circular notch 18c in the upper face of the plate member extending substantially half way through the thickness of the plate member and generally corresponding in depth to the depth of the relief X provided at 22g and 22j; the pilot holder is raised to clear the cutter blade with respect to the upper face of the plate member; set screw 24 is loosened to allow the cutter blade to be removed from the pilot holder; the pilot holder is lowered into the pilot hole to position pilot portion 20c and slot 20b below the lower face 18d of the plate member; cutter blade 22 is rotated through 180° and reinserted in slot 20b so that cutting edges 22k and 22h now face upwardly in confronting relation to the lower face 18d of the plate member; set screw 24 is tightened to move the head portion 24a into notch 22e; and the pilot holder is rotated in an opposite sense and is simultaneously moved axially upwardly to bring cutting edges 22k and 22h into engagement with the lower face 18d of the plate member and form a circular notch in the lower face of the plate member corresponding to circular notch 18c formed in the upper face of the plate member. As soon as the notch being formed in the lower face of the plate member reaches the lower extent of the notch 18c in the upper face of the plate member, a through hole is formed in the plate member and a slug 18e is simultaneously formed having a concentric central bore 18a constituted by the original pilot hole in the plate member 18. The pilot holder may now be moved upwardly to pass the cutter blade through the formed hole in plate member 18 and position the pilot holder and cutter blade above the upper face of the plate member, where set screw may be loosened to allow removal of the cutter blade and removal of the slug 18d from the pilot holder, whereafter the cutter blade may be rotated through 180° and reinserted in the slot 20b preparatory to a new hole cutting operation. The cutting tool assembly of the FIGS. 8-14 embodiment may thus be utilized to cut very large diameter holes in plate members having a thickness of up to twice the relief X provided at 22g and 22j in the cutter blade.

It will be seen that the invention provides an improved method and apparatus for cutting relatively large holes in plate members and, specifically, provides an apparatus and method for forming large holes in relatively thick metallic plate members without the use of heavy duty power equipment. The invention will further be seen to provide an improved cutting apparatus of the pilot holder and cutter blade type in which counterbores or spot faces may be formed in both the upper and lower faces of a plate member using the same cutter blade. The invention will further be seen to provide an improved cutter blade for use in forming circular notches in plate members and/or for use in forming large diameter slugs having concentric central holes and/or for use in cutting large circular holes in relatively thick plate members.

Whereas preferred embodiments of the invention have been illustrated and described in detail, it will be apparent that various changes may be made in the disclosed embodiments without departing from the scope or spirit of the invention.

I claim:

1. A cutting tool assembly comprising:
   (A) an elongated pilot holder including an upper attachment portion for removable receipt in a chuck, a shank portion below said attachment portion and including a transverse through slot, and a pilot portion below said shank portion and including a central threaded axial bore opening at its upper end in said transverse slot and at its lower end in the lower end of said pilot portion;
   (B) a set screw for threaded receipt in said threaded axial bore and defining a head at its upper end for upward projection into said slot; and
   (C) a cutter blade adapted to be positioned in said slot in transverse relation to said pilot holder and including a central attachment portion having a thickness and height generally corresponding respectively to the thickness and length of said slot so as to be slidably received in said slot, a right cutting portion extending to one side of said pilot holder and including a cutting edge at the lower transverse side of said blade, a left cutting portion extending to the other side of said pilot holder and including a cutting edge at the lower transverse side of said blade, a notch in the lower side of said attachment portion sized to receive said head of said set screw with said blade in a first position with its cutting edges downwardly disposed so as to cut downwardly into a piece of material in response to downward movement of said pilot holder with said pilot portion positioned in a previously provided pilot hole in the material, and a matching notch in the upper side of said attachment portion sized to receive said head of said set screw with said blade in a second, reversed position with its cutting edges upwardly disposed so as to cut upwardly into the material in response to upward movement of said pilot holder with said shank portion disposed in the pilot hole to dispose said slot and said blade below the materials, said cutting edge on each of said right and left cutting portions being provided only at the peripheral outer edge of the respective cutting portion with each portion relieved between its outer peripheral edge and the attachment portion so as to provide a circular notch in the face of the material into which the blade is advanced.

2. A method of performing cutting operations on both sides of a plate member comprising:
   (A) providing a pilot hole in the plate member;
   (B) mounting a cutter blade transversely in an elongated pilot holder in a position such that a cutting edge at the transverse side of the blade nearest one end of the holder is spaced axially from said one holder end;
   (C) moving said holder in one axial direction to pass said one holder end into the pilot hole and move the cutting edge into one side of the plate member to perform a cutting operation on said one side of said plate member;
   (D) removing the cutting blade from the holder, rotating the blade 180′, repositioning the blade transversely in the holder so that said cutting edge is on the transverse side of said blade remote from said one holder end, and adjusting said holder axially relative to the plate member such that said cutting edge is in confronting relation to the other side of the plate member; and
   (E) moving said holder member in the other axial direction to move said cutting edge into the other side of the plate member to perform a cutting operation on said other side of the plate member;
   (F) said blade including left and right cutting portions extending for equal distances from the left and right sides of the holder;
   (G) said cutting edge comprising a cutting edge provided only at the outer peripheral edge of each blade cutting portion with each cutting portion relieved between its outer peripheral cutting edge and the holder so that circular notches are cut in the respective sides of the plate member by the cutter blade.

3. The method according to claim 2 wherein the combined depth of the notches formed in the respective sides of the plate member equals the thickness of the plate member so that the notches coact to remove a slug from the plate member and form a circular hole in the plate member.

4. A cutter blade for use with an elongated pilot holder including a transverse slot for removable receipt of the cutter blade in a position transverse to the central axis of the pilot holder, said blade comprising:
   (A) a central attachment portion sized to fit in the slot in the pilot holder and including attachment means for removable attachment of the blade to the pilot holder; and
   (B) left and right cutting portions on opposite sides of said attachment portion and each including a cutting edge at the outer peripheral edge thereof at one transverse side of said blade and each being relieved between the cutting edge and the attachment portion with the relieved area between said attachment portion and each cutting edge being devoid of a cutting edge so that cutting occurs only at said outer peripheral edges in response to rotation of the pilot holder whereby to form a circular notch in a workpiece.

5. A blade according to claim 4 wherein:
   (C) said blade is formed of a flat elongated bar having a height and thickness generally corresponding respectively to the height and thickness of the transverse slot in the pilot holder;
   (D) said central portion is the full height of said bar; and
   (E) said cutting portions are the full height of said bar at their outer peripheral cutting edges and of reduced height between their cutting edges and said attachment portion.

6. A cutter blade according to claim 5 wherein:
(F) said attachment means comprises a notch formed in said attachment portion at said one transverse side of said blade.

7. A cutter blade according to claim 6 wherein:
(G) said attachment means further comprises a second notch formed in said attachment portion at the other transverse side of said blade.

* * * * *